United States Patent
Iijima et al.

(10) Patent No.: US 8,137,441 B2
(45) Date of Patent: Mar. 20, 2012

(54) $CO_2$ RECOVERY SYSTEM AND WASTE-PRODUCT REMOVING METHOD

(75) Inventors: Masaki Iijima, Hiroshima (JP); Tomio Mimura, Hyogo (JP); Yasuyuki Yagi, Hyogo (JP)

(73) Assignees: Mitsubishi Heavy Industries Ltd., Tokyo (JP); The Kansai Electric Power Co., Inc, Osaka-shi, Osaka (JP)

( * ) Notice: Subject to any disclaimer, the term of this patent is extended or adjusted under 35 U.S.C. 154(b) by 285 days.

(21) Appl. No.: 11/932,073

(22) Filed: Oct. 31, 2007

(65) Prior Publication Data
US 2008/0223215 A1 Sep. 18, 2008

(30) Foreign Application Priority Data
Mar. 14, 2007 (JP) ................... 2007-065634

(51) Int. Cl.
*B01D 53/14* (2006.01)

(52) U.S. Cl. ............ 95/183; 95/193; 95/209; 95/236; 96/242

(58) Field of Classification Search ........ 95/149–250; 96/242, 243–371; 423/210–248
See application file for complete search history.

(56) References Cited

U.S. PATENT DOCUMENTS

| | | | | |
|---|---|---|---|---|
| 3,880,756 A | * | 4/1975 | Raineri et al. | 210/97 |
| 5,019,361 A | * | 5/1991 | Hakka | 423/242.7 |
| 5,292,407 A | * | 3/1994 | Roy et al. | 205/431 |
| 5,393,505 A | | 2/1995 | Audeh | |
| 5,622,681 A | * | 4/1997 | Grierson et al. | 423/228 |
| 6,174,506 B1 | * | 1/2001 | Chakravarti et al. | 423/220 |
| 6,342,091 B1 | * | 1/2002 | Menzel et al. | 95/167 |
| 6,497,852 B2 | * | 12/2002 | Chakravarti et al. | 423/228 |
| 6,517,700 B2 | * | 2/2003 | Byszewski | 205/431 |
| 2006/0156923 A1 | * | 7/2006 | Meckl et al. | 95/236 |
| 2007/0020163 A1 | * | 1/2007 | Asprion et al. | 423/220 |
| 2007/0148068 A1 | * | 6/2007 | Burgers et al. | 423/220 |
| 2007/0148070 A1 | * | 6/2007 | Chakravarti et al. | 423/220 |
| 2007/0286784 A1 | * | 12/2007 | Rhodes et al. | 423/228 |

FOREIGN PATENT DOCUMENTS

| | | |
|---|---|---|
| EP | 0148604 A1 | 7/1985 |
| EP | 1695756 A1 | 8/2006 |
| EP | 1 886 991 A1 | 2/2008 |
| JP | 5-245339 A | 9/1993 |

(Continued)

OTHER PUBLICATIONS

Russian Office Action dated Oct. 30, 2007, issued in corresponding Russian Patent Application No. 2007140303/15.

(Continued)

*Primary Examiner* — Duane Smith
*Assistant Examiner* — Thomas McKenzie
(74) *Attorney, Agent, or Firm* — Westerman, Hattori, Daniels & Adrian, LLP

(57) ABSTRACT

A $CO_2$ recovery system includes an absorption tower and a regeneration tower. $CO_2$ rich solution is produced in the absorption tower by absorbing $CO_2$ from $CO_2$-containing gas. The $CO_2$ rich solution is conveyed to the regeneration tower where lean solution is produced from the rich solution by removing $CO_2$. A reclaimer heats the lean solution that is produced in the regeneration tower to produce a condensed waste-product from the lean solution by condensing a depleted material contained in the lean solution, and removes the condensed waste-product. A cooler cools the condensed waste-product.

4 Claims, 3 Drawing Sheets

FOREIGN PATENT DOCUMENTS

| | | |
|---|---|---|
| JP | 09-155156 A | 6/1997 |
| JP | 2003-093835 A | 4/2003 |
| JP | 2005-40683 A | 2/2005 |
| JP | 2005-262004 A | 9/2005 |
| RU | 2239488 C2 | 11/2004 |
| SU | 481296 A | 8/1975 |
| SU | 1261698 A1 | 10/1986 |
| WO | 00/66249 A1 | 11/2000 |
| WO | 2007-075400 A2 | 7/2007 |

OTHER PUBLICATIONS

Decision of Patent Grant issued Nov. 13, 2009 in corresponding Russian Patent Application 2007140303/15.

European Search Report dated Mar. 22, 2010, issued in corresponding European Patent Application No. 07119774.

Japanese Office Action dated Mar. 22, 2011, issued in corresponding Japanese Patent Application No. 2007-065634.

* cited by examiner

CO₂ RECOVERY SYSTEM AND WASTE-PRODUCT REMOVING METHOD

BACKGROUND OF THE INVENTION

1. Field of the Invention

The present invention relates to a $CO_2$ recovery system and a method of removing a depleted material, which is produced in the $CO_2$ recovery system, from a reclaimer in a short period.

2. Description of the Related Art

In recent years the greenhouse effect has been pointed out as one of causes of the global warming, and a countermeasure against it is urgently required internationally to protect global environment. $CO_2$ emitted into the atmosphere has been considered the prime cause of the greenhouse effect. $CO_2$ sources range various fields of human activities, including burning of fossil fuels, and demands to suppress their $CO_2$ emission from these sources are on constant increase. Scientists have energetically studied means and methods for suppressing emission of $CO_2$ from power generation facilities such as power generation stations which use an enormous amount of fossil fuels. One of the methods includes bringing combustion exhaust gas of boilers into contact with an amine-based $CO_2$-absorbing solution. This method allows removal and recovery of $CO_2$ from the combustion exhaust gas. Another method includes storing recovered $CO_2$, i.e., not returning the recovered $CO_2$ to the atmosphere.

Various methods are known to remove and recover $CO_2$ from combustion exhaust gas using the $CO_2$-absorbing solution. Japanese Patent Application Laid-Open No. H5-245339 discloses a method of contacting the combustion exhaust gas with the $CO_2$-absorbing solution in an absorption tower, heating an absorbing solution having absorbed $CO_2$ in a regeneration tower, and releasing $CO_2$, regenerating the absorbing solution, and circulating the regenerated absorbing solution to the absorption tower again to be reused.

As shown in FIG. 3, in a conventional $CO_2$ recovery system 1000, $CO_2$-containing exhaust gas 1002 discharged from a factory 1001 is cooled with coolant water 1003 in a cooling tower 1004. The factory 1001 can be a boiler. The cooled $CO_2$-containing exhaust gas 1002 is then conveyed to an absorption tower 1006 where it is brought into countercurrent contact with $CO_2$-absorbing solution 1005. The $CO_2$-absorbing solution 1005 can be an alkanolamine-based solution. $CO_2$ in the $CO_2$-containing exhaust gas 1002 is absorbed into the $CO_2$-absorbing solution 1005, that is, $CO_2$ is removed from the $CO_2$-containing exhaust gas 1002. The $CO_2$-absorbing solution 1005 containing $CO_2$ (hereinafter, "rich solution 1007") is conveyed to a regeneration tower 1008. The rich solution 1007 drips downward in the regeneration tower 1008. When the rich solution 1007 reaches a lower portion of the regeneration tower 1008, most of the $CO_2$ absorbed ii the rich solution 1007 is released, and the rich solution 1007 turns into lean solution 1009 capable of working as the $CO_2$-absorbing solution 1005. The lean solution 1009 is returned to the absorption tower 1006 and it is reused as the $CO_2$-absorbing solution 1005.

In the $CO_2$ recovery system 1000, material such as a sulfur oxide (SOx) remain un-removed in a desulphurization step. Such residual material reacts with alkanolamine contained in the $CO_2$-absorbing solution 1005 in the $CO_2$-removing process or an amine is oxidized in a process of recovering $CO_2$ front the exhaust gas thereby producing a thermostable salt. The thermostable salt mixes with the lean solution 1009, which creates various issues. The thermostable salt cannot be removed under normal conditions in a course of producing the lean solution 1009 from the rich solution 1007, so that the thermostable salt accumulates in the system while the lean solution 1009 circulates.

The $CO_2$ recovery system 1000 includes a reclaimer 1040 to which the lean solution 1009 that is produced in the regeneration tower 1008 is supplied. The reclaimer 1040 heats the lean solution 1009 to produce a condensed depleted material such as a salt. The condensed depleted material is then removed.

More particularly, the lean solution 1009 passing through a lean-solution supply line 1022 is extracted through an extracting line 1041 that is stretched from the lean-solution supply line 1022 to the reclaimer 1040, and the depleted material is removed from the extracted lean solution 1009 in the reclaimer 1040. The lean solution 1009 is heated in the reclaimer 1040 to, for example, 130° C. to 150° C., so that $CO_2$-absorbing solution is vaporized from the lean solution 1009. A vaporized $CO_2$-absorbing solution 1047 is supplied to the lower portion of the regeneration tower 1008. A condensed waste-product 1042 accumulated on a bottom of the reclaimer 1040 is removed, for example, by pumping with a pump.

Assuming that the capacity of the $CO_2$ recovery system 1000 to recover $CO_2$ is about 300 tons per day, about 10 $m^2$ of the condensed waste-product 1042 accumulates in the reclaimer 1040. A cooling period of one to two weeks is required for the condensed waste-product 1042 to cool-down before it can be removed.

A reclaimer with higher capacity for accumulating condensed waste-product is required for a $CO_2$ recovery system having a higher capacity to remove $CO_2$. For example, if the capacity of the $CO_2$ recovery system 1000 is to recover 1,000 tons to 3,000 tons of $CO_2$ per day, 30 $m^3$ to 100 $m^3$ of the condensed waste-product 1042 accumulates in the reclaimer 1040.

In the large-capacity $CO_2$ recovery system, which employs the natural-cooling method, a longer cool-down period is required. It may take one month or longer or the cooling-down period in a near feature. There is a need for shortening the period for which the condensed waste-product stays in the reclaimer.

In addition, in the case of the natural-cooling method, the depleted material that is being cooled-down adheres to a steam supply line 1050 for supplying saturated steam 1046, so that the steam supply line 1050 needs to be periodically detached for cleaning.

SUMMARY OF THE INVENTION

It is an object of the present invention to at least partially solve the problems in the conventional technology.

According to an aspect of the present invention, there is provided a $CO_2$ recovery system including an absorption tower that receives $CO_2$-containing gas and $CO_2$-absorbing solution, and causes the $CO_2$-containing gas to come in contact with the $CO_2$-absorbing solution to produce $CO_2$ rich solution, and a regeneration tower that receives the rich solution and produces lean solution from the rich solution by removing $CO_2$ from the rich solution. The $CO_2$ recovery system includes a heating unit that receives the lean solution produced in the regeneration tower and heats the lean solution to obtain condensed waste-product from the leap solution; and a cooling unit that receives the condenses waste-product from the heating unit and cools the condensed waste-product.

According to another aspect of the present invention, there is provided a method of removing waste-product in a $CO_2$ recovery system including an absorption tower that receives $CO_2$-containing gas and $CO_2$-absorbing solution, and causes the $CO_2$-containing gas to come in contact with the $CO_2$-absorbing solution to produce $CO_2$ rich solution, and a regeneration tower that receives the rich solution and produces lean solution from the rich solution by removing $CO_2$ from the rich solution. The method includes taking out the lean solution produced in the regeneration tower and heating the lean solution to obtain condensed waste-product from the lean solution; and taking out the condensed waste-product and cooling the condensed waste-product.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
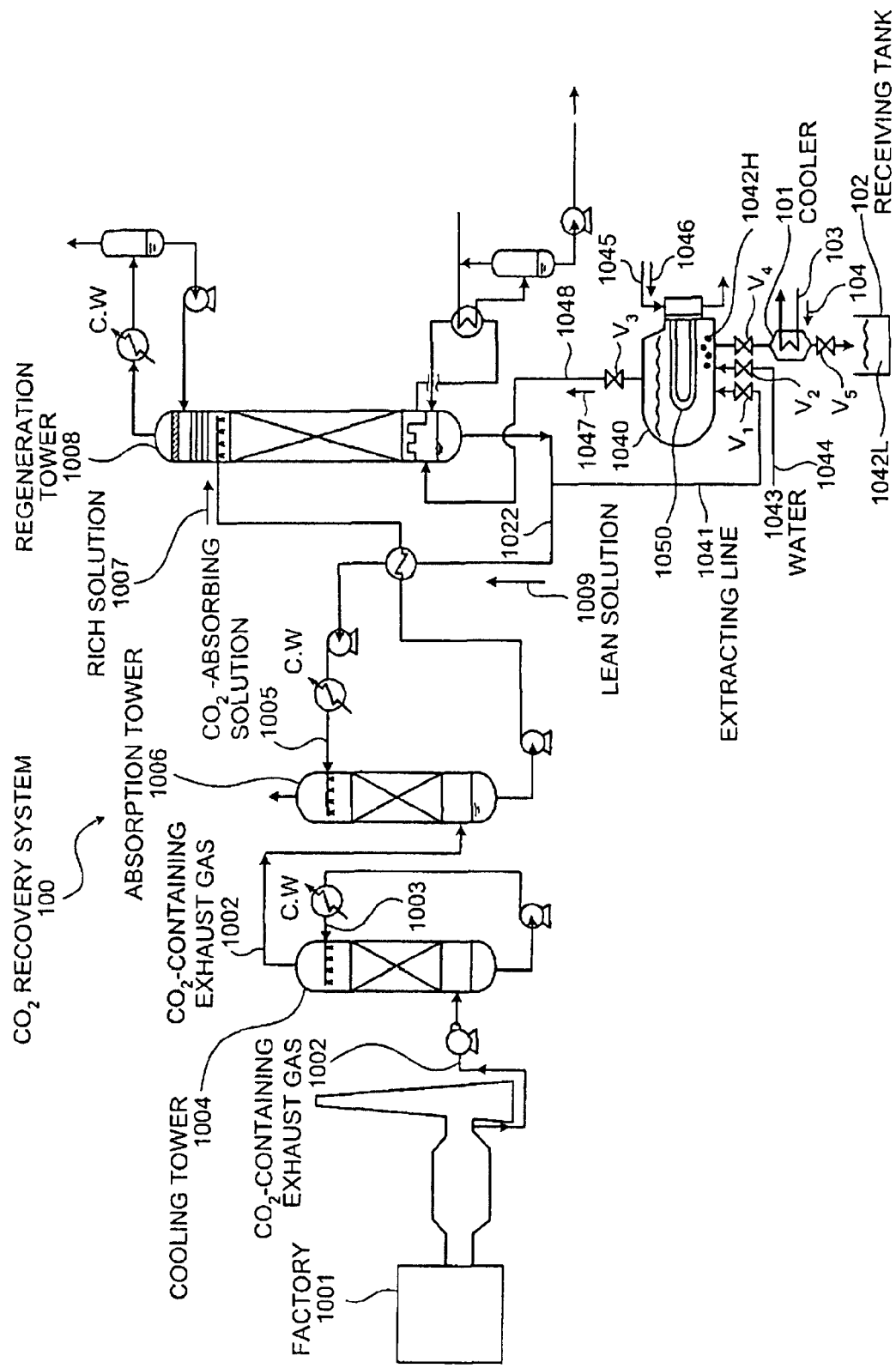
FIG. 1 is a schematic diagram of a $CO_2$ recovery system according to an embodiment of the present invention.
Figure 2:
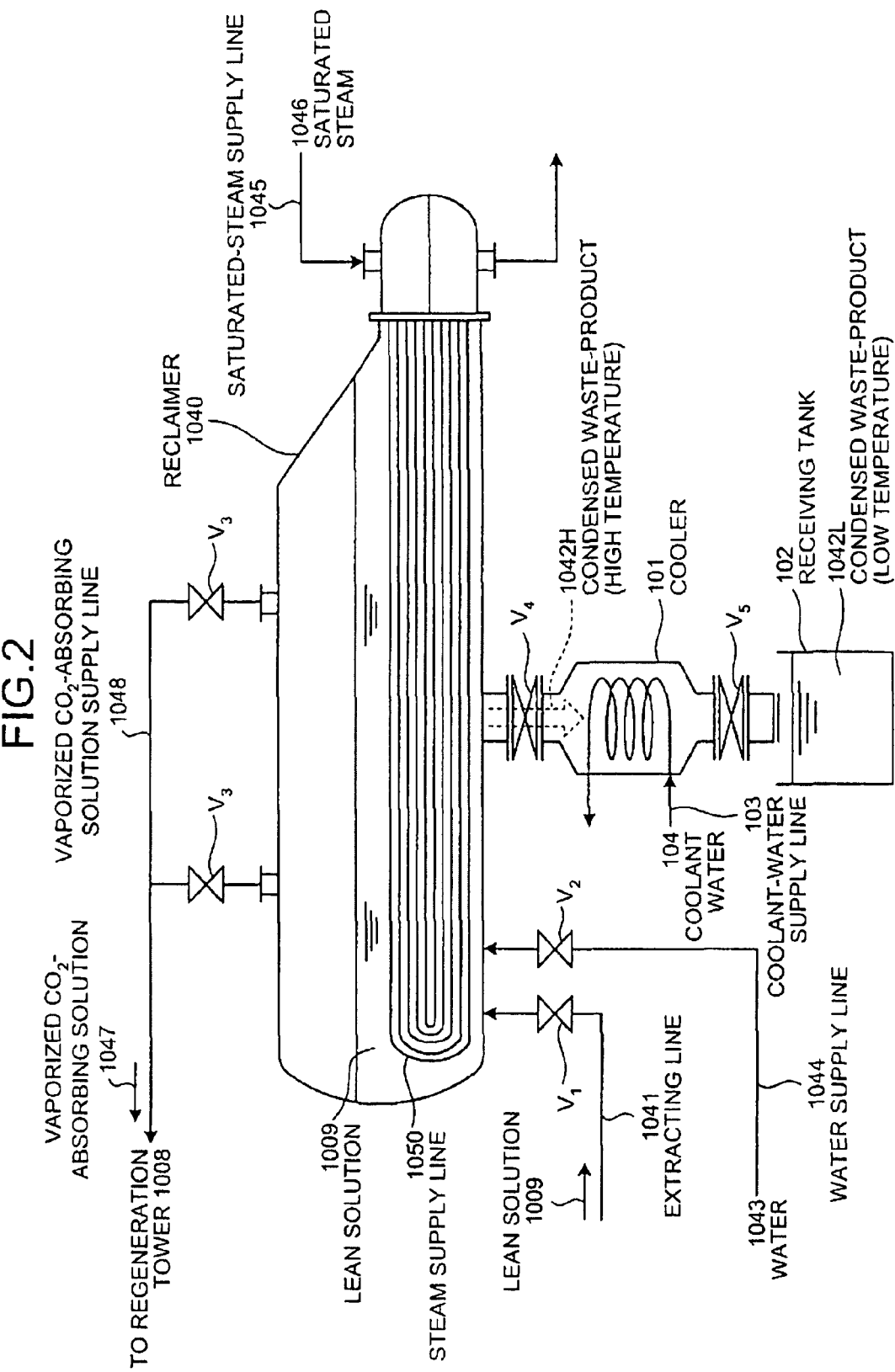
FIG. 2 is an enlarged schematic diagram of a reclaimer and relevant parts shown in FIG. 1.
Figure 3:
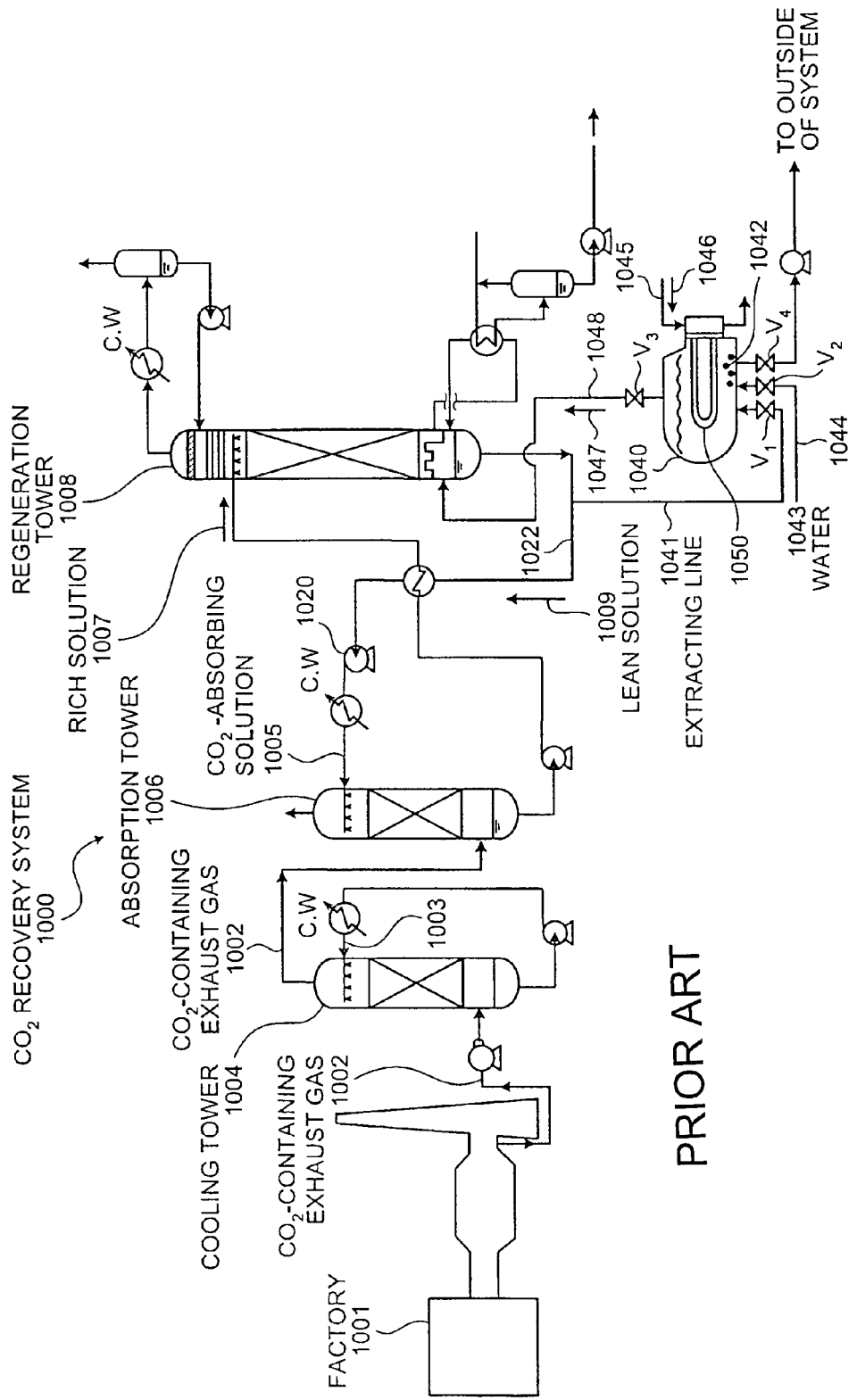
FIG. 3 is a schematic diagram of a conventional $CO_2$ recovery system.

FIG. 1 is a schematic diagram of a $CO_2$ recovery system 100 according to an embodiment of the present invention, and FIG. 2 is an enlarged schematic diagram of the reclaimer 1040 and relevant parts shown in FIG. 1. The same components as those of the conventional $CO_2$ recovery system shown in FIG. 3 are assigned with the same reference numerals, and explanation thereof is omitted.

As shown in FIG. 1, the $CO_2$ recovery system 100 includes the absorption tower 1006, the regeneration tower 1008, the reclaimer 1040, and a cooler 101. The absorption tower 1006 receives the $CO_2$-containing exhaust gas 1002 and the $CO_2$-absorbing solution 1005, and causes the $CO_2$-containing exhaust gas 1002 to come in contact with the $CO_2$-absorbing solution 1005 to produce the rich solution 1007. The regeneration tower 1008 receives the rich solution 1007 and produces the lean solution 1009 from the rich solution 1007 by removing $CO_2$ from the rich solution 1007. The reclaimer 1090 receives the lean solution 1009 that is produced in the regeneration tower 1008 and heats the lean solution 1009 to produce a condensed waste-product 1042H by condensing a depleted material contained in the lean solution 1009. The cooler 101 receives the high-temperature condensed waste-product 1042H and cools the condensed waste-product 1042H to produce a low-temperature condensed waste-product 1042L.

A receiving tank 102 is provided below the cooler 101. The receiving tank 102 receives the condensed waste-product 1042L from the cooler 101.

A valve $V_1$ controls flow of the lean solution 1009 in the extracting line 1041 to the reclaimer 1090. A valve $V_2$ controls flow of water 1043 in a water supply line 1044 to the reclaimer 1040. A valve $V_3$ controls flow of the vaporized $CO_2$-absorbing solution 1047, which is produced in the reclaimer 1040, in a vaporized $CO_2$-absorbing solution supply line 1048 to a lower portion of the regeneration tower 1008. A valve $V_4$ controls flow of the condensed waste-product 1042H, which is at a high temperature, from the reclaimer 1040 to the cooler 101. A valve $V_5$ controls flow of the condensed waste-product 1042L, which is at a low temperature, from the cooler 101 to the receiving tank 102.

The condensed waste-product 1042H or 1042L is the material obtained by heating the lean solution 1009 including a depleted material such as a salt. The depleted material is produced from the amine-based absorbing solution due to a chemical reaction that occurs when $CO_2$ is separated from the CO2-containing exhaust gas 1002 in the absorption tower 1006.

In the $CO_2$ recovery system 100, a part of the lean solution 1009 is conveyed to the reclaimer via the extracting line 1041.

When the valve $V_1$ is open, the lean solution 1009 flows to the reclaimer 1040 via the extracting line 1041. When the valve $V_2$ is open, the water 1043 flows to the reclaimer 1040 via the water supply line 1044. When the saturated steam 1046 is supplied to the reclaimer 1040 via a saturated-steam supply line 1045, the lean solution 1009 and the water 1043 in the reclaimer 1040 met heated by the saturated steam 1046 so that the vaporized $CO_2$-absorbing solution 1047 is produced. The vaporized $CO_2$-absorbing solution supply line 1048 has two of the valves $V_3$ at different positions. When both the valves $V_3$ are open, the vaporized $CO_2$-absorbing solution 1047 flows to the lower portion or the regeneration tower 1008 via the vaporized $CO_2$-absorbing solution supply line 1048. When the valve $V_3$ is open, both of the valve $V_4$ arranged between the reclaimer 1040 and the cooler 101 and the valve $V_5$ arranged below the cooler 101 are closed.

The cooler 101 is located below the reclaimer 1040. When a predetermined amount of the condensed waste-product 1042H is produced in the reclaimer 1040, a portion of the condensed waste-product 1042H is conveyed to the cooler 101. The cooler 101 cools that portion of the condensed waste-product 1042H.

Given below is an explanation of how the condensed waste-product 1042H is conveyed from the reclaimer 1040 to the cooler 101 and cooled.

First, the lean solution 1009 and the water 1043 are heated in the reclaimer 1040 to produce the high-temperature condensed waste-product 1042H by condensing the depleted material in the lean solution 1009. Then, the valve $V_4$ is open whereby the condensed waste-product 1042H is conveyed to the cooler 101. When the valve $V_4$ is open state, the valve $V_5$ is closed. After a portion of the condensed waste-product 1042H is conveyed to the cooler 101, the valve $V_4$ is closed.

When the valve $V_4$ is in closed state, the portion of the condensed waste-product 1042H is cooled by coolant water 104 that is poured into the cooler 101 via a coolant-water supply line 103.

To cool the condensed waste-product 1042H in a short period, it is recommended that the amount of the portion of the condensed waste-product 1042H that is conveyed at one time is small, or example, 0.2 $m^3$ to 3 $m^3$.

The high-temperature condensed waste-product 1042H is cooled in the cooler 101 to a temperature of about 50° C. or less. This cooling produces the low-temperature condensed waste-product 1042L. The condensed waste-product 1042L is then conveyed from the cooler 101 to the receiving tank 102, while the valve $V_5$ is opened and the valve $V_4$ is closed.

After the condensed waste-product 1042L is completely conveyed to the receiving tank 102, the valve $V_5$ is closed and the valve $V_4$ is opened. As a result, another new portion of the high-temperature condensed waste-product 1042H flows from the reclaimer 1040 to the cooler 101. The cooler 101 now cools the new portion of the condensed waste-product 1042H. This process, i.e., cooling process, is repeated until all the high-temperature condensed waste-product 1042H is cooled.

In this manner, a small portion of the condensed waste-product 1042H is transported from the reclaimer 1040 to the cooler 101 and cooled, and the cooled condensed waste-product 1042L is transported from the cooler 101 to the receiving tank 102, and this process is repeated for the whole condensed waste-product 1042H. Because only a small portion is processed each time, the condensed waste-product 1042H can be removed from the reclaimer 1040 in a shorter period.

Thereafter, the low-temperature condensed waste-product 1042L is conveyed to a processing tank (not shown) by a tank truck (tanker lorry) (not shown) or the like, or temporarily stored in a storage tank (not shown).

During the cooling process, because the reclaimer 1040 always contains therein the high-temperature condensed waste-product 1042H, the reclaimer 1040 is always maintained in hot state. As a result, the depleted material, such as a salt contained in the lean solution 1009, does not adhere to the steam supply line 1050. It means that the steam supply line 1050 need not be detached for cleaning.

In the $CO_2$ recovery system 100, because the condensed waste-product 1042H is hot while it is in the reclaimer 1040, even if a reclaimer has a large capacity in which a large amount or condensed waste-product can accumulated, the condensed waste-product can be removed front such a reclaimer in a shorter period. It means that, when a large amount of high-temperature condensed waste-product, for example 30 m³ or larger, accumulates in the large reclaimer as a result of recovery of a large amount of $CO_2$, for example 1000 tons or larger, the $CO_2$ recovery system 100 can process the large amount of the high-temperature condensed waste-product in a shorter period.

According to an embodiment of the present invention, a small portion of condensed waste-product is transported in hot state from a reclaimer to a cooler and cooled, and this process is repeated for the whole condensed waste-product. Because only a small portion is processed each time, the condensed waste-product can be removed from the reclaimer in a shorter period.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A $CO_2$ recovery system comprising:
   an absorption tower suitable for receiving a $CO_2$-containing gas and a $CO_2$-absorbing solution, and the absorption tower suitable for causing the $CO_2$-containing gas to come in contact with the $CO_2$-absorbing solution to produce a $CO_2$ rich solution, and
   a regeneration tower suitable for receiving the $CO_2$ rich solution and suitable for producing a lean solution from the $CO_2$ rich solution by removing $CO_2$ from the $CO_2$ rich solution,
   a reclaimer suitable for receiving a part of lean solution, produced in the regeneration tower and removed via an extracting line when a first valve is open, wherein the reclaimer further comprises an external water source suitable for supplying water to the reclaimer when a second valve is open, a heating means suitable for heating the part of lean solution to obtain a heated condensed waste-product from the part of lean solution and to obtain a vaporized $CO_2$ absorbing solution, a means for feeding the vaporized $CO_2$ absorbing solution via a vaporized $CO_2$-absorbing solution supply line to a lower portion of the regeneration tower when a third valve is open, and a means for conveying a part of heated condensed waste-product from the whole heated condensed waste-product when the third valve is closed but a fourth valve is open, and wherein the first valve is arranged on the extracting line and below the reclaimer, the second valve is arranged on the water supply line and below the reclaimer, the third valve is arranged on the vaporized $CO_2$-absorbing solution supply line and above the reclaimer, and the fourth valve is arranged below the reclaimer;
   a cooling unit suitable for receiving the part of heated condensed waste-product from the reclaimer to be cooled to the specified temperature every time, the cooling unit suitable for cooling the part of heated condensed waste-product by coolant water that is poured into the cooling unit via a coolant water supply line when the fourth valve and a fifth valve are closed, wherein the cooling unit further comprises a means for conveying a part of cooled condensed waste-product when the fourth valve is closed but the fifth valve is open, and wherein the fifth valve is arranged below the cooling unit; and
   a receiving tank suitable for receiving the part of condensed waste-product cooled by the cooling unit.

2. The $CO_2$ recovery system according to claim 1, in which the coolant temperature of the condensed waste-product in the cooling unit is equal to or below 50° C.

3. A method of removing waste-product in a $CO_2$ recovery system comprising:
   an absorption tower suitable for receiving a $CO_2$-containing gas and a $CO_2$-absorbing solution, and the absorption tower suitable for causing the $CO_2$-containing gas to come in contact with the $CO_2$-absorbing solution to produce a $CO_2$ rich solution, and
   a regeneration tower suitable for receiving the $CO_2$ rich solution and suitable for producing a lean solution from the $CO_2$ rich solution by removing $CO_2$ from the $CO_2$ rich solution,
   taking out a part of lean solution produced in the regeneration tower and heating the part of lean solution in a reclaimer to obtain a heated condensed waste-product from the part of lean solution, wherein the reclaimer is arranged below the regeneration tower;
   taking out a part of heated condensed waste-product obtained from the reclaimer from the whole condensed waste-product, and cooling the part of heated condensed waste-product in a cooling unit every time to a specified temperature to produce a cooled condensed waste-product and removing the part of cooled condensed waste product, and feeding the $CO_2$ absorbing solution vaporized in the reclaimer to the regeneration tower, wherein the cooling unit is arranged below the reclaimer;
   conveying the cooled condensed waste-product from the cooling unit to a receiving tank, wherein the receiving tank is arranged below the cooling unit; and
   flowing another new part of heated condensed waste-product from the reclaimer to the cooling unit, thereby enabling the cooling unit to be ready for cooling the new part of heated condensed waste-product,
   wherein the cooling is repeated until all the heated condensed waste-product is cooled.

4. The method according to claim 3, wherein the part of heated condensed waste-product is cooled in the cooling unit to a temperature equal to or below 50° C.

* * * * *